United States Patent [19]
Yuhi et al.

[11] Patent Number: 5,382,852
[45] Date of Patent: Jan. 17, 1995

[54] MINIATURE MOTOR

[75] Inventors: Toshiya Yuhi; Takahiro Ohtake; Masahiko Kato; Ryouichi Someya, all of Chiba, Japan

[73] Assignee: Mabuchi Motor Co., Ltd., Chiba, Japan

[21] Appl. No.: 95,608

[22] Filed: Jul. 21, 1993

[30] Foreign Application Priority Data

May 31, 1993 [JP] Japan ................... 5-128611

[51] Int. Cl.6 .......................................... H02K 5/04
[52] U.S. Cl. ................... 310/40 MM; 310/42; 310/71
[58] Field of Search ............ 310/40 MM, 71, 89, 241, 310/248, 242, 43, 42, 90, 156; 439/733, 733.1, 746, 747, 751, 869, 870, 871, 872, 873

[56] References Cited

U.S. PATENT DOCUMENTS

| | | | |
|---|---|---|---|
| 3,874,763 | 4/1975 | Hoover | 439/746 |
| 4,852,576 | 8/1989 | Mayumi et al. | 310/71 |
| 5,270,599 | 12/1993 | Aoyagi et al. | 310/71 |
| 5,281,876 | 1/1994 | Sato | 310/40 MM |

FOREIGN PATENT DOCUMENTS 1911836 11/1970 Germany ................... 310/71

*Primary Examiner*—R. Skudy
*Attorney, Agent, or Firm*—McGlew & Tuttle

[57] ABSTRACT

A miniature motor includes a case made of metallic material and formed into a bottomed hollow cylindrical shape and having a permanent magnet fixedly fitted to the inner circumferential surface thereof. A rotor is provided with an armature and a commutator. A case cap is fitted to an open end of the case and has brushes making sliding contact with the commutator. Input terminals are electrically connected to the brushes directly or via other electrically conductive material. The rotor is rotatably supported by bearings provided on the case bottom and the case cap. Through holes formed into a T shape in cross-sectional profile are provided on the case cap made of a resin material. The input terminals each having a stopper on the lower end thereof and a lanced and raised piece on the central part thereof are passed in the through holes, the lanced and raised pieces are bent to almost right angles with the input terminal surface to fixedly fit the input terminals to the case cap.

4 Claims, 8 Drawing Sheets

MINIATURE MOTOR

BACKGROUND OF THE INVENTION AND RELATED ART STATEMENT

This invention relates generally to a miniature motor used for audio equipment, precision equipment, automotive electrical equipment, etc., and more specifically to improvements of means for fixedly fitting input terminals to a case cap comprising a miniature motor.

FIG. 1 is a longitudinal sectional view illustrating a miniature motor of a conventional type. In FIG. 1, reference numeral 1 refers to a case made of a metallic material, such as mild steel, formed into a bottomed hollow cylindrical shape and having an arc-segment-shaped permanent magnet 2 fixedly fitted on the inner circumferential surface thereof. In the case 1 disposed is a rotor 5 comprising an armature 3 facing the permanent magnet 2, and a commutator 4. Next, numeral 6 refers to a case cap made of an insulating material, such as a resin material, fitted to an open end of the case 1. Numeral 7 refers to a brush provided in such a manner that the free end thereof makes sliding contact with the commutator 4, and disposed on the case cap 6, together with an input terminal 8 electrically connected to the brush 7. Numerals 9 and 10 denote bearings, each fixedly fitted to the bottom of the case 1 and the central part of the case cap 6, respectively, to rotatably support shafts 11 and 12 constituting the rotor 5.

With the above construction, when current is fed from the terminals 8 to the armature 3 via the brushes 7 and the commutator 4 comprising the rotor 5, rotating force is imparted to the armature 3 existing in a magnetic field formed by the permanent magnet 2 fixedly fitted to the inner circumferential surface of the case 1, causing the rotor 5 to rotate, driving external equipment (not shown) via the shaft 11 on the output side.

Conventional means for fixedly fitting the input terminals 8 to the case cap 6 in the miniature motor having the aforementioned construction include that shown in FIG. 2. That is, a serrated projection 13 is provided on the side edge of the input terminal 8, and press-fitted into a hole 14 provided on the case cap 6. In this case, the width $W_1$ of the hole 14 is made slightly smaller than the width $W_2$ of the serrated projection 13 on the input terminal 8. Thus, as the input terminal 8 is press-fitted from under into the hole 14, the projection 13 proceeds in the hole 14 while deforming or shaving off the side edge of the hole 14, holding the input terminal 8 securely in position.

With the above construction, even when external force P is exerted to the input terminal 8 in the direction shown by an arrow in the figure, the input terminal 8 and the brush 7 connected thereto or formed integrally therewith can be held in place. The input terminal 8, however, which is held in place by frictional force alone between the projection 13 and the hole 14, has small resistance to the external force P. Furthermore, when the input terminal 8 is press-fitted into the hole 14, the projection 13 proceeds in the hole 14 while shaving off the side edge of the hole 14, as noted earlier. This causes the input terminal 8 to be deformed, or causes chips to adhere on the inside surface of the case cap 6 or on the surfaces of the input terminal 8, the brush 7, etc., causing adverse effects on the characteristics of the motor.

Next, FIGS. 3 is a cross-sectional front view, illustrating another example of conventional means for fixedly fitting the input terminal 8 to the case cap 6, and FIG. 4 is a longitudinal sectional view illustrating an area in the vicinity of the input terminal 8. Like parts are indicated by like reference numerals shown in FIG. 2. In FIGS. 3 and 4, numeral 15 refers to a lanced and raised piece provided in advance in the central part of the input terminal 8. The size $t_1$, in the thickness direction of the hole 14 provided on the case cap 6, is made smaller than the size $t_2$ in the thickness direction of the lanced and raised piece 15. Thus, the input terminal 8 can be locked to a predetermined location, as in the case of FIG. 2, by press-fitting the input terminal 8 from under into the hole 14.

The embodiment having the aforementioned construction has a better engaging and locking action than the embodiment shown in FIG. 2, due to the resiliency of the lanced and raised piece 15. But the strength to withstand the external force P in the direction shown by an arrow is small because the fixedly fitting force relies solely on the frictional force between the lanced and raised piece 15 and the hole 14. In addition, there is a fear that chips are generated when the input terminal 8 is press-fitted to the hole 14.

FIG. 5 is a longitudinal sectional view illustrating still another embodiment of conventional means for fixedly fitting the input terminal 8 to the case cap 6. Like parts are indicated by like numerals used in FIG. 4. In FIG. 5, t designates a thickness of the input terminal 8. In the embodiment shown in FIG. 5, the lanced and raised piece 15 is formed in such a manner as to appear on the outer end face of the case cap 6 by the resiliency of the lanced and raised piece 15 when the input terminal 8 is press-fitted into the hole 14. This allows the lanced and raised piece 15 to act as a retaining stopper to withstand the external force P in the direction shown by the arrow.

There still remains a problem that chips are generated, as in the case of the embodiment shown in FIG. 4, because the lanced and raised piece 15 proceeds while shaving off the inside surface of the hole 14 when the input terminal 8 is press-fitted into the hole 14. In addition, there is a likelihood of the size $t_3$ of the hole 14 in the thickness direction becoming larger than the thickness t of the input terminal 8, thus reducing the engaging and locking action caused by frictional force. Furthermore, there often occur unwanted phenomena including a gap C being formed between the free end of the lanced and raised piece 15 and the outer end face of the case cap 6, or of the free end of the lanced and raised piece 15 not being exposed completely on the outer end face of the case cap 6. This also poses a problem that the lanced and raised piece 15 cannot have a stopper action as expected.

To overcome the aforementioned problems, the present Applicant has filed an application for an invention of a miniature motor comprising a case made of a metallic material, formed into a bottomed hollow cylindrical shape, and having a permanent magnet fixedly fitted to the inner circumferential surface thereof, a rotor comprising an armature, which faces the permanent magnet, and a commutator, and a case cap having brushes making sliding contact with the commutator, and input terminals electrically connected to the brushes; the rotor being rotatably supported by bearings provided on the bottom of the case and the case cap; characterized in that the input terminals are press-fitted to the case cap made of a resin material, and then fixedly fitted to the case cap via lanced and raised pieces formed on the input terminals at locations near the outer end face of the case cap. (Refer to U.S. patent application Ser. No. 07/918,565, now U.S. Pat. No. 5,270,599.)

FIG. 6 is a partially cross-sectional front view illustrating a case cap in an embodiment of the aforementioned improvement invention. FIG. 7 is a diagram illustrating the essential part viewed from the direction shown by arrow A in FIG. 6. Like parts are indicated by like numerals shown in FIGS. 3 through 5. In FIGS. 6 and 7, numeral 15 refers to a lanced and raised piece. The lanced and raised piece 15 is formed on an input terminal 8 so that the free end 15a of the lanced and raised piece 15 positively comes in contact with the outer end face 6a of the case cap 6, by a means as will be described later, after the input terminal 8 has been press-fitted into the hole 14 and secured or fitted to a predetermined location. The cross-sectional internal dimensions of the hole 14 provided on the case cap 6 is made essentially the same as the cross-sectional external dimensions of the input terminal 8.

With the aforementioned construction, since the input terminal 8 comes in close contact with the hole 14 provided on the case cap 6, and the free end 15a of the lanced and raised piece 15 positively comes in contact with the outer end face 6a of the case cap 6, the free end 15a acts as a stopper, increasing the retaining effect, even if external force P is exerted in the direction shown by the arrow. When the input terminal 8 is press-fitted into the hole 14, no chips are generated even when the external dimensions of the input terminal 8 is made essentially the same as the internal dimensions of the hole 14, because the lanced and raised piece 15 has not yet been formed on the input terminal 8. Thus, the surface and surrounding area of the input terminals 8 and the brushes 7 can be kept clean.

FIG. 8 is a diagram of assistance in explaining the construction of an input terminal fitting jig in an embodiment of the aforementioned improvement invention. In FIG. 8, numeral 21 refers to a table having a holder 22 at the central part thereof, and a receiving blade 23 at a location corresponding to the location to which the input terminal 8 of the case cap 6 is fitted. Numeral 24 refers to a lancing and raising blade provided in such a manner that the lancing and raising blade 24 can be engaged with or disengaged from the receiving blade 23, and moved horizontally on the table 21 by a driving member 25. Numeral 26 refers to rollers rotatably provided at the rear ends of the driving member 25 having the lancing and raising blade 24.

Next, numeral 27 refers to a working member formed in a vertically movable manner via a guide (not shown) provided on the table 21; with a press-fitting member 28 provided at the central part thereof in such a manner as to be vertically movable with the working member 27, and roller retainers 29, which can be engaged with or disengaged from the rollers 26, provided on the outer end thereof. Numeral 30 refers to a cylinder connecting shank, and 31 to a spring; each provided in such a manner as to drive the working member 27 and the press-fitting member 28.

FIG. 9 is an enlarged perspective view illustrating the receiving blade 23 and the lancing and raising blade 24 shown in FIG. 8. Like parts are indicated by like numerals shown in FIG. 8. In FIG. 9, numeral 23a refers to a blade formed by cutting the upper end of the receiving blade 23 into a square or U shape in such a manner as to engage with the lancing and raising blade 23 protruded in a triangular shape in longitudinal section. The receiving blade 23 and the lancing and raising blade 24 should preferably be formed using a jig material, such as tool steel. The upper end surfaces of the receiving blade 23 and the lancing and raising blade 24 are formed in such a manner as to be flush with the upper end surface of the holder 22, that is, the outer end surface of the case cap 6.

With the above construction, a case cap 6 is placed and positioned on the holder 22, as shown in FIG. 8, with the inside side surface upward. The input terminal 8 (in the state where the brush 7 is bonded thereto, as shown in FIGS. 3 and 4, and the lanced and raised piece 15 has not yet been formed) is inserted, and the working member 27 and the press-fitting member 28 are lowered. The input terminal 8 is press-fitted into the case cap 6 by the press-fitting member 28. As the working member 27 is lowered while the press-fitting member 28 is kept pushed slightly onto the case cap 6, the roller retainers 29 are engaged with the rollers 26, causing the driving member 25 to move to the side of the input terminal 8. Thus, the lancing and raising blade 24 proceeds and cuts into the input terminal 8, and engages with the receiving blade 23 to form the lanced and raised piece 15, as shown in FIGS. 6 and 7. As a result, the input terminal 8 is engaged with and fitted to the case cap 6. Upon completion of the engaging and fitting operation, the component members are operated in a reversed direction (opposite the direction shown by the arrow in FIG. 8) to remove the case cap 6. Then, a new case cap is loaded to repeat the above operations.

With the aforementioned construction, the free end of the lanced and raised piece 15 provided on the input terminal 8 can be accurately made flush with the outer end surface of the case cap 6. Thus, the input terminal 8 can be positively engaged with and fixedly fitted to the case cap 6 without relative movement caused between the input terminal 8 and the case cap 6 even when external force is applied.

In miniature motors used for automotive electrical components, however, connectors are frequently used to feed power to the input terminal 8. In this type of miniature motor, a hollow tubular connecting member (not shown) is provided integrally with the case cap 6 in the vicinity of the free end of the input terminal 8. Thus, this arrangement makes it impossible to put this invention into practical use because the aforementioned connecting member may interfere with the input terminal 8 when forming the lanced and raised piece 15 on the input terminal 8 after the input terminal 8 has been press-fitted, as shown in FIGS. 8 and 9. For this reason, the conventional means for fixedly fitting the input terminals has to be relied upon. Thus, a number of problems are encountered, such as the generation of chips, or lowered reliability due to insufficient fixing strength.

Since the strength for fixedly fitting the input terminals 8 to the case cap 6 relies solely on the frictional force between both, a larger resistance to external pulling force is required for a type using connectors, for example, while a sufficient resistance to external pulling force is provided for types of ordinary specifications.

SUMMARY OF THE INVENTION

It is the first object of this invention to provide a miniature motor in which no chips are generated when fixedly fitting input terminals to the case cap.

It is the second object of this invention to provide a miniature motor in which input terminals can be fixedly fitted easily and positively even when connecting members are present in the vicinity of the input terminals.

It is the third object of this invention to provide a miniature motor in which input terminals have a sufficient resistance to external pulling force.

DETAILED DESCRIPTION OF THE EMBODIMENTS

Figure 10:
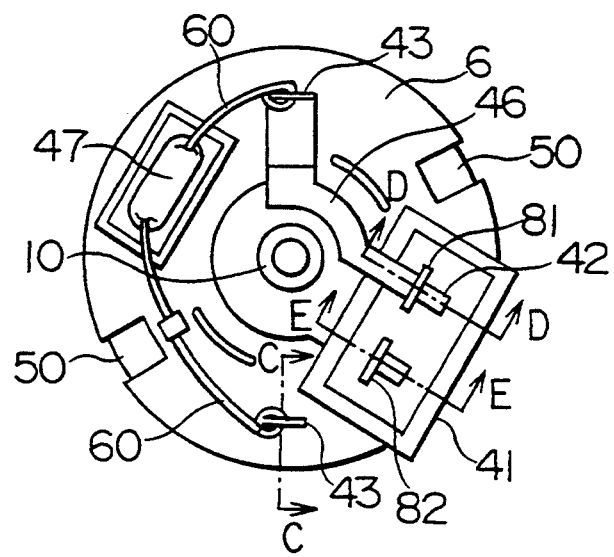
FIGS. 10 and 11 are a plan view and bottom view, respectively, illustrating a case cap in an embodiment of this invention.
Figure 11:
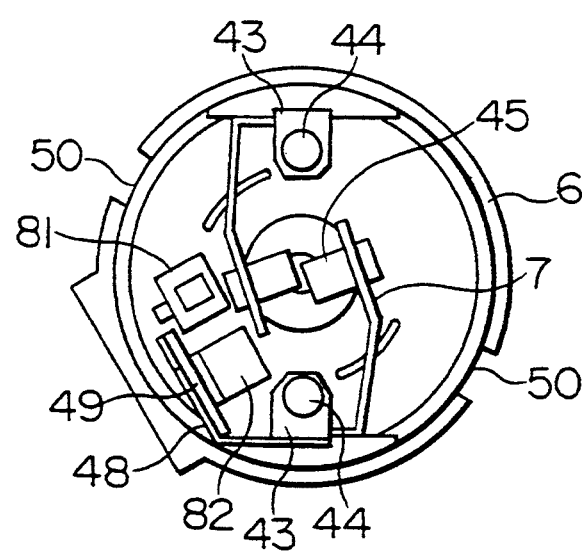
Figure 12:
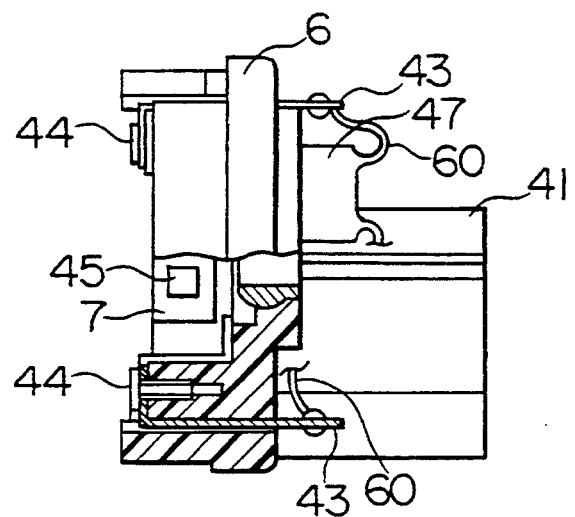
FIGS. 12 through 14 are cross-sectional views taken along line C—C, line D—D and line E—E in FIG. 10.
Figure 13:
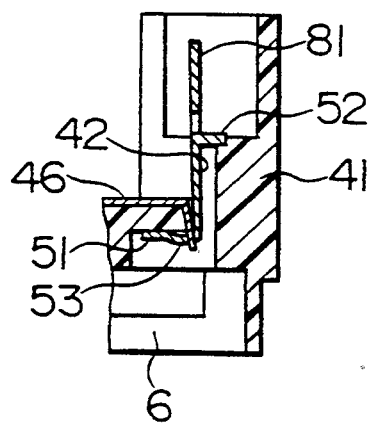
Figure 14:
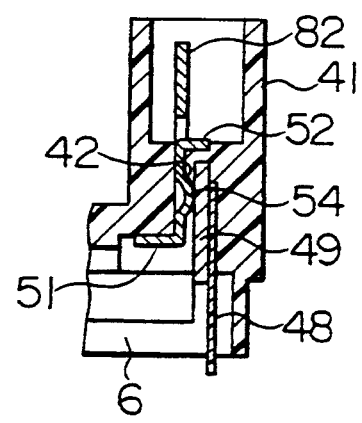

FIGS. 10 and 11 are a plan view and bottom view illustrating a case cap in an embodiment of this invention. FIGS. 12 through 14 are cross-sectional views taken along line C—C, line D—D and line E—E in FIG. 10. Like parts are shown by like numerals used in FIGS. 1 through 8.

In FIGS. 10 through 14, a case cap 6 is made of an insulating material, such as a resin material, and formed into an essentially cup shape, with a hollow tubular connecting member 41 being integrally provided in such a manner to protrude from the external side end face thereof. Numerals 81 and 82 refer to a pair of input terminals formed in such a manner as will be described later, and fixedly fitted by inserting into through holes 42 having a T shape in cross section provided on the case cap 6. The free ends of the input terminals 81 and 82 are provided in such a manner as to protrude toward the connecting member 41.

Next, numeral 43 refers to a connecting terminal formed into an essentially L-shape in longitudinal section, provided on the case cap 6 via a mounting member 44 in such a manner as to cause the connecting end thereof to protrude toward the outer side end face of the case cap 6. A brush 7 formed into an essentially L shape in longitudinal section and having a sliding contact shoe 45 on the free end thereof is connected to the connecting terminal 43 inside the case cap 6. Another connecting terminal 43 is electrically connected to the input terminal 81 via an electrically conductive member 46, and a capacitor 47 is electrically connected across the connecting terminals 43 via a lead wire 60.

Numeral 48 refers to a gripping member made of an electrically conductive material and formed into an essentially U shape in planar projection profile (the view of FIGS. 17B and 18), as will be described later, with one leg coming in contact with the connecting terminal 43, and the other leg, in conjunction with the input terminal 82, gripping a positive temperature coefficient resistor 49 formed into an essentially quadrilateral shape.

With the aforementioned construction, as the case cap 6 is engaged with the open end of the case 1, and engaging projections (not shown) provided on the open end of the case 1 is bent toward engaging parts 50 provided on the case cap 6, the case 1 and the case cap 6 can be assembled together. In this case, the positive temperature coefficient resistor 49 provided on the case cap 6 has such a characteristic that the internal resistance value thereof sharply rises when the temperature of the miniature motor rises above a certain value (100° C., for example).

Consequently, when the temperature of a miniature motor rises due to the overcurrent flowing as an overload which is continually applied to the miniature motor, or the rotation of the miniature motor is forcibly braked, the internal resistance value of the positive temperature coefficient resistor 49 rises sharply, causing the current fed to the miniature motor to fall rapidly to prevent the miniature motor from being overheated. The capacitor 47 connected across the connecting terminals 43 is for reducing electrical noise generated by the miniature motor.

Figure 15A:
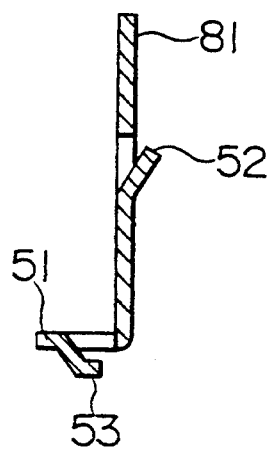
FIGS. 15A through 15C are a longitudinal sectional view, left side view and bottom view illustrating the input terminal 81 shown in FIGS. 10, 11 and 13.
Figure 15B:
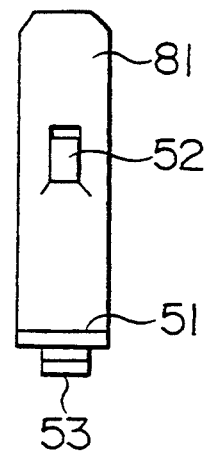
Figure 15C:
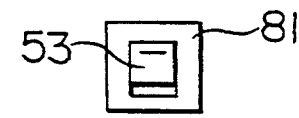
Figure 16A:
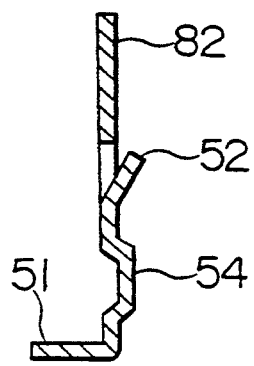
FIGS. 16A and 16B are a longitudinal sectional view and left side view illustrating the input terminal 82 shown in FIGS. 10, 11 and 14.
Figure 16B:
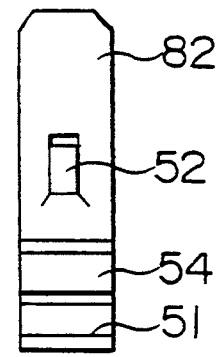

Next, the construction of the input terminals 81 and 82 will be described. FIGS. 15A through 15C are a longitudinal sectional view, left side view and bottom view, respectively, illustrating the input terminal 81 in FIGS. 10, 11 and 13. FIGS. 16A and 16B are a longitudinal sectional view and left side view, respectively, illustrating the input terminal 82 in FIGS. 10, 11 and 14.

In FIGS. 15A through 15C, the input terminal 81 is made of an electrically conductive material and formed into an essentially L shape in longitudinal section to provide a stopper 51 on the lower end thereof. Next, a lanced and raised piece 52 is provided on the central part of the input terminal 81, and a lanced and raised projection 53 is provided on the stopper 51.

In FIGS. 16A and 16B, on the other hand, the input terminal 82 is also made of an electrically conductive material and formed into an essentially L shape in longitudinal section, and a stopper 51 is formed on the lower end thereof and with a lanced and raised piece 52 on the central part thereof, as in the case of the input terminal 81 in FIGS. 15A through 15C. Numeral 54 refers to a projection provided between the stopper 51 and the lanced and raised piece 52 in such a manner as to protrude toward the lanced and raised piece 52. The aforementioned input terminals 81 and 82 should preferably be formed by press forming means.

Figure 17A:
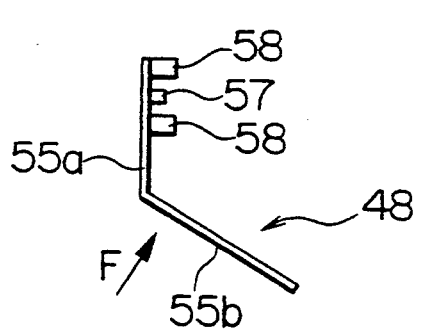
FIGS. 17A and 17B are a side view and front view illustrating the gripping member 48 in FIGS. 11 and 14.
Figure 17B:
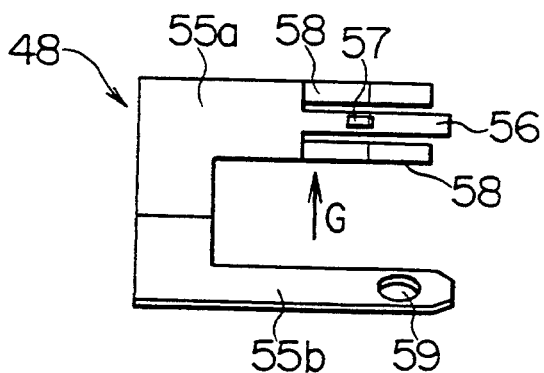
Figure 18:
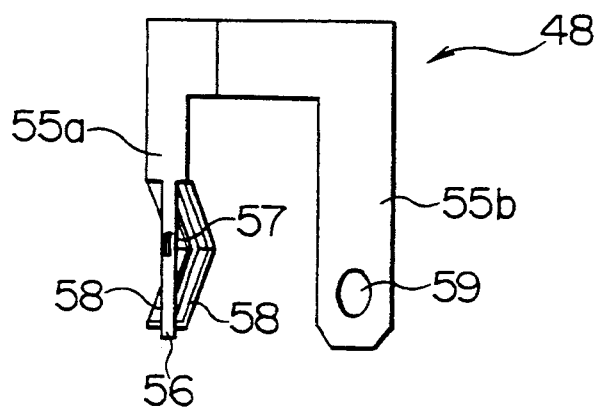
FIG. 18 is a diagram viewed from the direction shown by arrow F in FIG. 17A.
Figure 19:
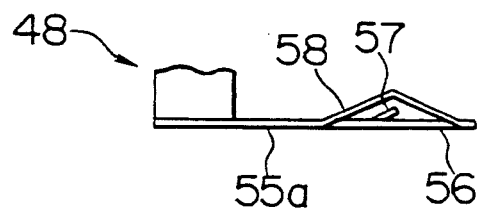
FIG. 19 is a diagram viewed from the direction shown by arrow G in FIG. 17B.

FIGS. 17A and 17B are a side view and front view, respectively, illustrating the gripping member 48 in FIGS. 11 and 14. FIGS. 18 and 19 are a diagram viewed from the direction shown by arrow F in FIG. 17A and a diagram viewed from the direction shown by arrow G in FIG. 17B, respectively. In FIGS. 17A through 19, the gripping member 48 is made of an electrically conductive resilient material and formed into an essentially U shape in planar projection profile, having legs 55a and 55b. The angle between the legs 55a and 55b is 120', for example, in FIG. 17A The tip of the leg 55a is formed into a three-pronged fork shape, for example, with a central prong 56 having a lanced and raised piece 57, and prongs 58 on both sides having gripping parts formed by bending in such a manner as to protrude toward the raised side of the lanced and raised piece 57. Numeral 59 refers to a hole provided at the tip of the other leg 55b to reinforce the engaging action of the gripping member 48 with the case cap 6 (refer to FIGS. 10 through 14).

With the aforementioned construction, the method of fitting the input terminals 81 and 82, and the gripping member 48 to the case cap 6 will be described. First, the input terminals 81 and 82 are inserted from the inside of the case cap 6, or from under, into the through hole 42 in FIGS. 13 and 14. In this case, the input terminals 81 and 82 having the lanced and raised pieces 52 on the central parts thereof, as shown in FIGS. 15A through 16B, can be easily inserted into the through holes 42, because the through holes 42 are formed into a T shape in cross section, as shown in FIG. 10.

Next, the input terminals 81 and 82 are fixedly fitted to the case cap 6 by bending the lanced and raised pieces 52 to almost right angles with the surface of the input terminals 81 and 82 after the input terminals 81 and 82 have been inserted until the stoppers 51 thereof come into contact with the end face of the case cap 6. Thus, the resistance of the input terminals 81 and 82 to longitudinal extracting force can be maintained. The lanced and raised pieces 52 can be bent using a bending jig that is constructed so as to allow the relative movement of the input terminals 81 and 82 in the longitudinal direction. In this case, the presence of the connecting members 41 in the vicinity of the input terminals 81 and 82 does not pose interference during machining since machining is performed in the longitudinal direction of the input terminals 81 and 82.

After the input terminals 81 and 82 have been fixedly fitted to the case cap 6, the input terminal 81 is electrically connected to the electrically conductive member 46 by plastically deforming the lanced and raised projection 53 upward to grip the end of the electrically conductive member 46, as shown in FIG. 13. Next, the gripping member 48 is inserted, together with the connecting terminal 43 and the brush 7, to a predetermined position of the case cap 6, and fixedly fitted to the case cap 6 via the mounting member 44, as shown in FIG. 11.

By so doing, the aforementioned members can be positively connected not only mechanically but electrically.

The leg 55a of the gripping member 48 shown in FIGS. 17A through 19 faces the input terminal 82 with a certain gap, as shown in FIGS. 11 and 14. This permits the positive temperature coefficient resistor 49 to be easily inserted between both. As the positive temperature coefficient resistor 49 is inserted between both, the prongs 58, which are bent or inclined in their free state, as shown in FIGS. 18 and 19, are elastically deformed into a flat state. Thus, the positive temperature coefficient resistor 49 can be positively held between the projection 54 of the input terminal 82 and the gripping member 48. In this state, even if an external force to extract the positive temperature coefficient resistor 49 is exerted, the lanced and raised piece 57 works the into the positive temperature coefficient resistor 49, thereby increasing the resistance to the extracting force and improving reliability.

After the components have been assembled in the aforementioned manner, the protruded ends of the connecting terminals 43 are connected to the lead wires 60 of the capacitor 47 by soldering, for example, as shown in FIGS. 10 and 12. In this case, electrical connection can be secured by connecting the end of the electrically conductive member 48 to the connecting terminal 43 by soldering, together with the lead wire 60.

Figure 20A:
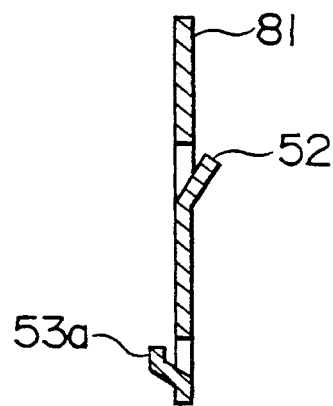
FIGS. 20A and 20B are a longitudinal sectional view and left side view illustrating a modified example of the input terminal 81 in an embodiment of this invention.
Figure 20B:
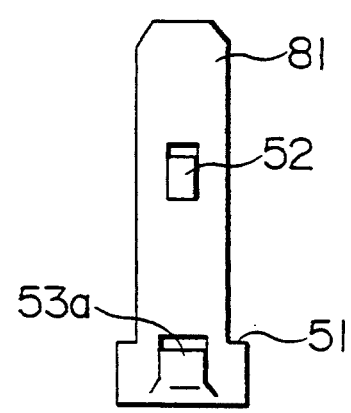
Figure 21A:
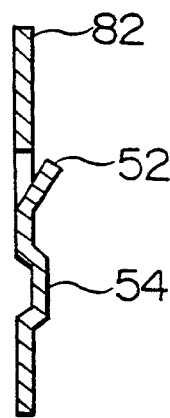
FIGS. 21A and 21B are a longitudinal sectional view and left side view illustrating a modified example of the input terminal 82 in an embodiment of this invention.
Figure 21B:
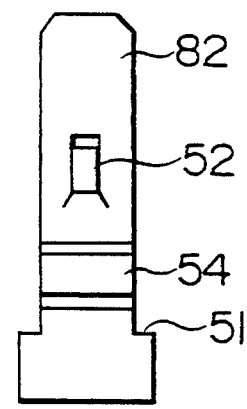

FIGS. 20A and 20B are a longitudinal sectional view and left side view, respectively, illustrating a modified example of the input terminal 81 in an embodiment of this invention. FIGS. 21A and 21B are a longitudinal sectional view and left side view, respectively, illustrating a modified example of the input terminal 82 in an embodiment of this invention. Like parts are indicated by like numerals used in FIGS. 15A through 16B. In FIGS. 20A through 21B, the input terminals 81 and 82 are formed in an essentially T shape in planar projection profile to provide stoppers 51. Numeral 53a refers to a lanced and raised part provided in the vicinity of the lower end of the input terminal 81.

With the aforementioned construction, the input terminals 81 and 82 can be fitted to the case cap 6 shown in FIGS. 10 through 14 in the same manner as described earlier. That is, the input terminals 81 and 82 can be fixedly fitted to the case cap 6 by bending the lanced and raised piece 52 after the input terminals 81 and 82 have been inserted until the stoppers 51 thereof come in contact with the end face of the case cap 6.

Figure 1:
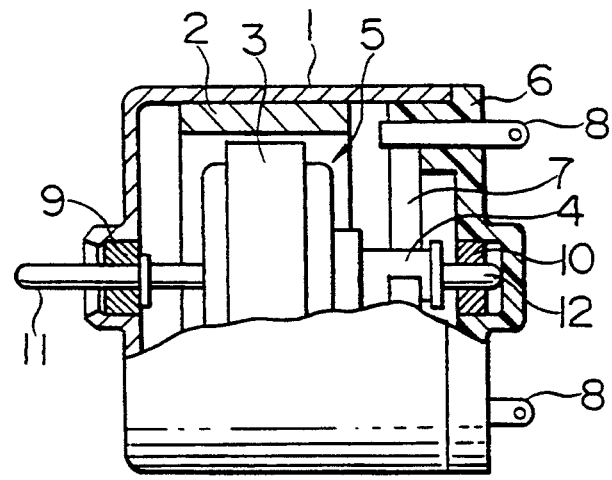
FIG. 1 is a cross-sectional front view illustrating the essential part of a miniature motor of a conventional type.
Figure 2:
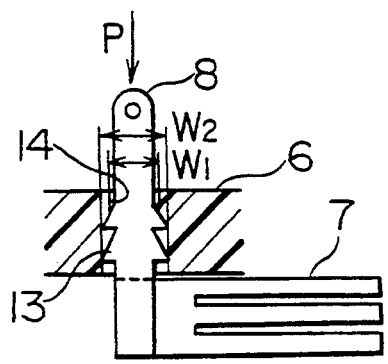
FIG. 2 is a cross-sectional front view illustrating the essential part of an example of conventional means for fixedly fitting an input terminal to a case cap.
Figure 3:
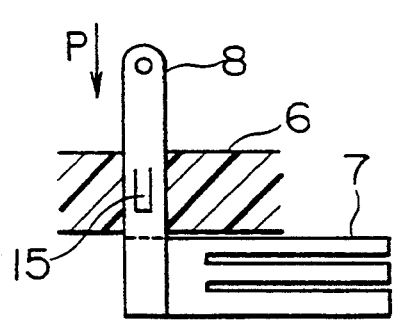
FIGS. 3 and 4 are a cross-sectional front view illustrating another example of conventional means for fixedly fitting an input terminal to a case cap, and a longitudinal sectional view illustrating an area in the vicinity of an input terminal, respectively.
Figure 4:
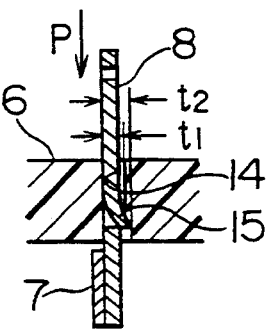
Figure 5:
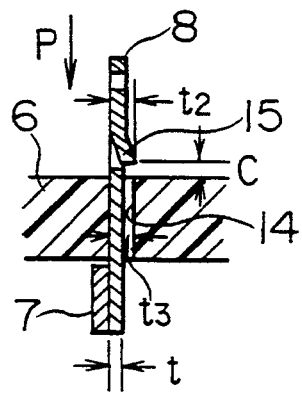
FIG. 5 is a longitudinal sectional view illustrating still another example of conventional means for fixedly fitting an input terminal to a case cap.
Figure 6:
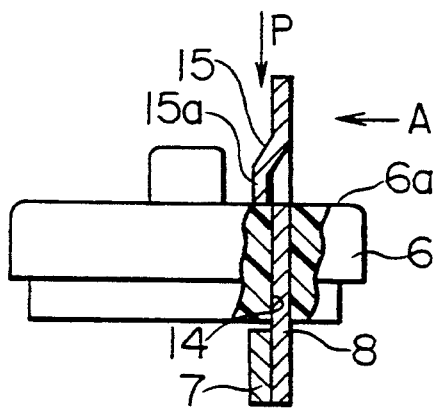
FIG. 6 is a partially sectional front view illustrating the essential part of a case cap in an embodiment of the previously proposed improvement invention.
Figure 7:
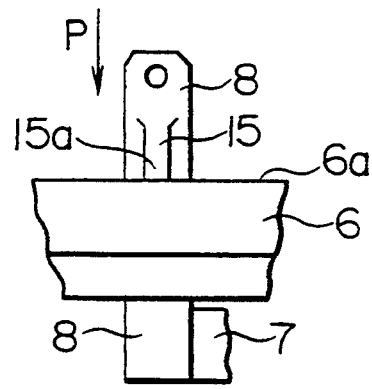
FIG. 7 is a diagram viewed from the direction shown by arrow A in FIG. 6.
Figure 8:
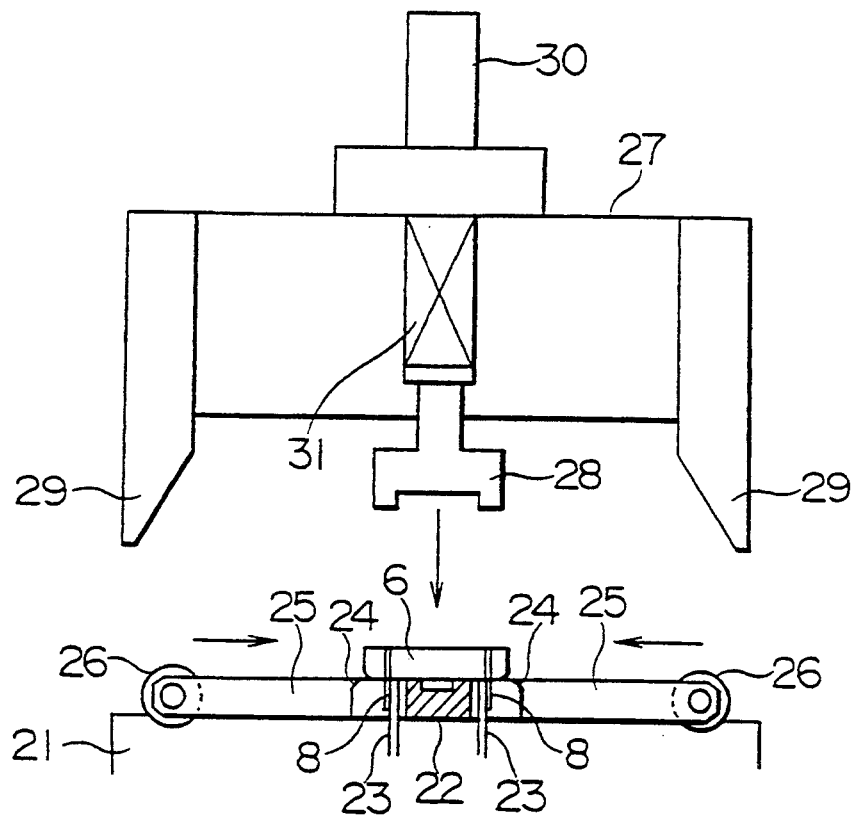
FIG. 8 is a diagram of assistance in explaining the construction of an input terminal fitting jig used in the previously proposed improvement invention.
Figure 9:
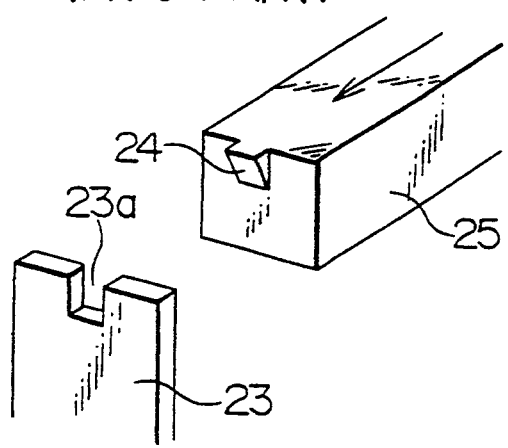
FIG. 9 is an enlarged perspective view illustrating a receiving blade 23 and a lancing and raising blade 24 shown in FIG. 8.

In this embodiment, description has been made about a construction in which a hollow tubular connecting member 41 is provided on the external side surface of a case cap 6 in a protruded manner, input terminals 81 and 82 exist inside the connecting member 41, and brushes 7 are electrically connected to the input terminals 81 and 82 via other electrically conductive members. This invention, however, can of course be applied to a miniature motor having a construction in which input terminals 8 are connected directly to brushes 7, as shown in FIG. 1.

This invention having the aforementioned construction and operation has the following effects.

(1) Since the input terminals are fixedly fitted to the case cap positively by means of the stoppers and the bent lanced and raised pieces, sufficient resistance to external pulling force is imparted, eliminating the accidental falling out of the input terminals, leading to a substantial improvement in reliability.

(2) Since the input terminals can be easily fitted to the case cap, generation of chips due to press-fitting can be eliminated, leading to improved motor characteristics.

(3) The input terminals can be fixedly fitted to the case cap easily and positively because the presence of other component members in the vicinity of the input terminals does not interfere with the bending of the lanced and raised pieces.

What is claimed is:

1. A miniature motor, comprising: a case formed of a metallic material into a bottomed hollow tubular shape;
   a permanent magnet fixedly fitted to an inner circumferential surface of said case;
   a rotor including an armature and a commutator, said rotor being positioned in said case;
   a case cap fitted to an open end of said case and having brushes making sliding contact with said commutator;
   terminals electrically connected to said brushes;
   bearings including a bearing provided on a bottom of said case and a bearing provided on said case cap, said bearings rotatably supporting said rotor, said case cap being formed of resin material and defining through holes having a T shape in cross section, said terminals each having a lower end with a stopper formed thereon and a central part with a lanced and raised piece, said terminals being inserted into said through holes, said lanced and raised piece being bent to substantially a right angle with respect to a surface of a corresponding terminal to fixedly fit each of said terminals to said case cap.

2. A miniature motor according to claim 1, wherein said lower end of each of said terminals is formed into an essentially L shape in longitudinal section by bending each terminal lower end to substantially a right angle with respect to a surface of said terminal, to form bent portions, each bent portion defining said stopper.

3. A miniature motor according to claim 1, wherein said lower end of each said terminal is formed into an essentially T shape and plane or projection profile by making a width of said lower end larger than a width of an intermediate portion of said terminal, said portion having an enlarged width forming said stopper.

4. A miniature motor according to claim 1, wherein said lanced and raised part is provided on a lower end of said input terminal and an electrically conductive member connected to said brush is connected to said lanced and raised part.

* * * * *